US012397577B1

(12) United States Patent
Duan

(10) Patent No.: US 12,397,577 B1
(45) Date of Patent: Aug. 26, 2025

(54) 3D RANDOM MAGNETIC PATTERN DIGITAL ANTI- COUNTERFEITING LABEL AND PREPARATION METHOD THEREOF

(71) Applicant: Great Bay University, Dongguan (CN)

(72) Inventor: Huawei Duan, Dongguan (CN)

(73) Assignee: Great Bay University, Dongguan (CN)

( * ) Notice: Subject to any disclaimer, the term of this patent is extended or adjusted under 35 U.S.C. 154(b) by 0 days.

(21) Appl. No.: 18/776,262

(22) Filed: Jul. 18, 2024

(51) Int. Cl.
*B42D 25/378* (2014.01)
*B41M 3/14* (2006.01)
*B42D 25/369* (2014.01)
*G07D 7/0047* (2016.01)

(52) U.S. Cl.
CPC ............ *B42D 25/378* (2014.10); *B41M 3/14* (2013.01); *B42D 25/369* (2014.10); *G07D 7/0047* (2017.05)

(58) Field of Classification Search
CPC ...... B42D 25/378; B42D 25/369; B41M 3/14; G07D 7/0047
USPC ........ 283/67, 70, 72, 74, 81, 82, 83, 94, 98, 283/901
See application file for complete search history.

(56) References Cited

U.S. PATENT DOCUMENTS

2020/0316981 A1* 10/2020 Phillips ................ C09D 11/102

* cited by examiner

*Primary Examiner* — Justin V Lewis

(57) ABSTRACT

A 3D random magnetic pattern digital anti-counterfeiting label and preparation method thereof are provided, which relate to the technical field of anti-counterfeiting labels. The 3D random magnetic pattern digital anti-counterfeiting label includes: a 3D magnetic ink anti-counterfeiting layer, including 3D magnetic photochromic nanoparticles, the 3D magnetic photochromic nanoparticles include: a first nano zinc oxide film layer, a first nano titanium dioxide film layer, a magnetic nano film layer, a second nano titanium dioxide film layer and a second nano zinc oxide film layer from bottom to top. The 3D random magnetic pattern digital anti-counterfeiting label shows bright stripes under different illumination angles, the 3D random magnetic pattern digital anti-counterfeiting label is rotated to observe a dynamic optically variable effect of magnetic ink from different angles to thereby distinguish the authenticity, and the bright stripes show regular circular particle patterns, which has high recognition and is easy to recognize.

8 Claims, 2 Drawing Sheets

3D RANDOM MAGNETIC PATTERN DIGITAL ANTI- COUNTERFEITING LABEL AND PREPARATION METHOD THEREOF

TECHNICAL FIELD

The disclosure relates to the technical field of anti-counterfeiting labels, and more particularly to a three-dimensional (3D) random magnetic pattern digital anti-counterfeiting label and a preparation method thereof.

BACKGROUND

For a long time, due to proliferation of counterfeit and inferior products, an anti-counterfeiting technology has been forced to constantly update, and a new anti-counterfeiting technology is even more needed in the market. At present, most of the traditional optical anti-counterfeiting technologies have defects such as low technical content, easy decryption of structural combinations, and easy bleaching of colors by light. Moreover, with development and promotion of high-resolution devices such as digital cameras, scanners, and printers, counterfeiters can use personal computers to produce high-quality counterfeit products.

Currently, commonly used laser anti-counterfeiting technologies include three aspects: laser holographic image anti-counterfeiting, encrypted laser holographic image anti-counterfeiting, and a laser photo-lithography anti-counterfeiting technology. A commonly used laser rainbow molding holographic graphic anti-counterfeiting technology is a visible graphic information made on a product by applying a laser rainbow holographic plate making technology and a molding replication technology. The latest laser holographic transfer technology has organically combined multiple technologies from different disciplines, such as laser holographic molding, computer photo-lithography, special plate making, precision electroforming for coarse and fine chemical engineering, and high-precision peeling, to first make a transferable holographic plastic film, and then transfer it to paper to make a laser holographic transfer paper. With more and more manufacturers mastering the laser anti-counterfeiting technology, a technology of changing images through light irradiation for anti-counterfeiting has fallen behind. In addition, accuracy of observing image changes with naked eye has also been greatly reduced, making it inconvenient for consumers to distinguish authenticity.

The existing digital anti-counterfeiting technology sets a unique set of codes for each product and stores the codes in a database. Consumers can inquire the codes in the database through the Internet, and the codes will be deleted after a successful inquire to make it unusable. A defect of this type of technology is that the codes cannot be inquired repeatedly, and other personnel in the entire commodity circulation link, such as dealers and agents, cannot inquire the codes. Moreover, not every consumer will inquire the anti-counterfeiting code, and the counterfeiters can still obtain the codes by recycling not queried labels to counterfeit new labels, thereby making it difficult to completely eliminate counterfeiting.

At present, some magnetic induction labels are also widely used in the field of anti-counterfeiting. Some anti-counterfeiting labels use magnetic recording information to achieve write and read anti-counterfeiting. There are also some magnetic induction labels that achieve an angle-dependent light change effect through magnetic fixation. However, the existing magnetic induction labels form a magnetic film through methods such as magnetron sputtering, vapor deposition, and evaporation, but these methods have expensive process equipment, low efficiency, and high cost, making them unsuitable for industrial production. Meanwhile, the existing magnetic induction labels are made by smashing the magnetic film and adding them to ordinary ink after evaporation, and then printing and performing magnetic fixation to form the magnetic induction labels, thereby achieving the angle-dependent light change (also referred to as angle-dependent color change) effect. However, since the smashing and cutting process has caused various scratches on a surface of the magnetic film, light refraction and absorption on the surface of the magnetic induction labels are inconsistent, and angle-dependent light change bright stripes are not obvious.

In order to prevent a problem of counterfeit product labels, there is an urgent need for an anti-counterfeiting label that has good concealment, low cost, and is not easy to be counterfeited, which is convenient for consumers to distinguish authenticity.

SUMMARY

Existing laser anti-counterfeiting technologies need a consumer to observe changes of an anti-counterfeiting image with naked eyes, which has low accuracy and inconvenience, and the existing digital anti-counterfeiting technology is easy to copy and forge. Moreover, existing magnetic induction labels are made by smashing a magnetic film and adding them to ordinary ink after evaporation, since the smashing and cutting process has caused various scratches on a surface of the magnetic film, light refraction and absorption on the surface of the magnetic induction labels are inconsistent, and angle-dependent light change bright stripes are not obvious. Aiming at the above problems, the disclosure provides a 3D random magnetic pattern digital anti-counterfeiting label and a preparation method thereof. In order to achieve the above purpose, the disclosure adopts the following technical solutions.

The 3D random magnetic pattern digital anti-counterfeiting label sequentially includes: a release film layer, an adhesive layer, a polyethylene terephthalate (PET) plastic film layer, a 3D magnetic ink anti-counterfeiting layer, a printing layer, an anti-scratch protective layer and an anti-counterfeiting check code shielding layer from bottom to top.

Specifically, the release film layer is made of PET, polyethylene (PE) or oriented polypropylene (OPP) material, and a thickness of the release film layer is in a range of 0.05-0.15 millimeters (mm). A coating amount of the adhesive layer is in a range of 20-26 grams per square meter (g/m$^2$). A thickness of the PET plastic film layer is in a range of 0.2-0.5 mm.

The 3D magnetic ink anti-counterfeiting layer is obtained by printing 3D magnetic anti-counterfeiting ink on the PET plastic film layer, and performing magnetic fixation and photo-curing on the 3D magnetic anti-counterfeiting ink to rearrange and orient 3D magnetic photochromic nanoparticles in the 3D magnetic anti-counterfeiting ink, to thereby achieve a magnetic photochromic effect that the 3D magnetic ink anti-counterfeiting layer generates 3D flicker and color changes from different perspectives.

Specifically, the 3D magnetic ink anti-counterfeiting layer includes: an anti-counterfeiting magnetic stripe area and an anti-counterfeiting quick response (QR) code area for writing and reading product information. The anti-counterfeiting magnetic stripe area is located at a lower end of the 3D random magnetic pattern digital anti-counterfeiting label, which is convenient for a magnetic card reader to write and read the product information. A bottom of the anti-counterfeiting magnetic stripe area is not coated with the adhesive layer, and left and right sides and a lower part of the anti-counterfeiting magnetic stripe area are die-cut, which is convenient for uncovering the anti-counterfeiting magnetic stripe area when the magnetic card reader needs to read data.

The anti-counterfeiting magnetic stripe area is obtained by printing the 3D magnetic anti-counterfeiting ink, coating a 300-500 mesh anilox roller, and curing with an ultraviolet (UV) lamp. The anti-counterfeiting QR code area is obtained by printing the 3D magnetic anti-counterfeiting ink, coating a 250-350 mesh anilox roller, and curing with the UV lamp.

The printing layer is printed with a logotype (LOGO) of company and an anti-counterfeiting check code, and the LOGO of company and the anti-counterfeiting check code are located on a LOGO area and an anti-counterfeiting check code area of the printing layer respectively. The anti-counterfeiting check code area is located at a bottom of a surface area of the anti-counterfeiting QR code area.

The anti-scratch protective layer is a pre-coated protective layer or a UV varnish protective layer. Specifically, the anti-scratch protective layer is the UV varnish protective layer, which has a good adhesion with the printing layer, and a strong adhesion with the 3D magnetic ink anti-counterfeiting layer. The UV varnish protective layer is obtained by coating printable UV varnish UV-503. Specifically, the UV-503 is a commercially available product of Dongguan EONLEO Chemical technology Co., Ltd. The anti-scratch protective layer is obtained by coating the 300-500 mesh anilox roller, and curing with the UV lamp.

The anti-counterfeiting check code shielding layer is obtained by screen printing scratch-off ink on the anti-scratch protective layer, and the scratch-off ink is SO74 series screen printing scratch-off ink from Dongguan Kaiyue Environmental Protection Technology Co., Ltd., or LD-S50866 series water-based scratch-off ink from Guangzhou Ledi New Materials Technology Co., Ltd.

The preparation method of the 3D random magnetic pattern digital anti-counterfeiting label described by the disclosure includes the following steps:

S1, preparing the 3D magnetic ink anti-counterfeiting layer by screen printing the anti-counterfeiting magnetic stripe area and the anti-counterfeiting QR code area of the 3D magnetic ink anti-counterfeiting layer on the PET plastic film layer with the 3D magnetic anti-counterfeiting ink, and performing magnetic fixation and UV curable on the 3D magnetic anti-counterfeiting ink, to rearrange and orient the 3D magnetic photochromic nanoparticles in the 3D magnetic anti-counterfeiting ink, to thereby achieve the magnetic photochromic effect that the 3D magnetic ink anti-counterfeiting layer generates 3D flicker and color changes from different perspectives; where the magnetic fixation and UV curable are commonly used technologies in the art, and are not be described in detail here.

S2, preparing the printing layer by ink-jet printing the LOGO of company, the anti-counterfeiting check code and other information on surfaces of the PET plastic film layer and the 3D magnetic ink anti-counterfeiting layer respectively, where the anti-counterfeiting check code is printed on the bottom of the surface area of the anti-counterfeiting QR code area, and the LOGO of company is printed above the anti-counterfeiting QR code area;

S3, preparing the anti-scratch protective layer by coating the UV varnish on surfaces of the PET plastic film layer and the 3D magnetic ink anti-counterfeiting layer, and photo-curing the UV varnish;

S4, preparing the anti-counterfeiting check code shielding layer by screen printing scratch-off ink on a surface of the anti-counterfeiting check code area, and hot air drying the scratch-off ink;

S5, writing product information through the anti-counterfeiting magnetic stripe area of the 3D magnetic ink anti-counterfeiting layer;

S6, coating an adhesive on a bottom of the PET plastic film layer to obtain the adhesive layer;

S7, covering the release film layer on the bottom of the PET plastic film layer after coating the adhesive;

S8, die-cutting the left and right sides, and the lower part of the anti-counterfeiting magnetic stripe area on the PET plastic film layer to obtain the 3D random magnetic pattern digital anti-counterfeiting label.

Specifically, a preparation method of the 3D magnetic anti-counterfeiting ink includes the following steps 1-2

In step 1, the 3D magnetic photochromic nanoparticles are prepared, and the step 1 specifically includes the following steps 1.1-1.7.

In step 1.1, an anodic aluminum oxide (AAO) template is prepared.

(1) Pre-Treatment of an Aluminum Foil

A. Cutting and Flattening

The aluminum foil with a thickness of 800-900 nanometers (nm) is cut into circular pieces with a diameter of 20 mm before using, so that they are suitable for a diameter of an electrolytic cell used during oxidation. In order to reduce uneven stress distribution caused by uneven cutting, the circular pieces are flattened by using a tablet press, and a pressure of the tablet press is controlled between 1.3-2 mega-pascals (MPa).

B. Annealing

Each flattened aluminum foil (i.e., the circular pieces) is annealed at 400-500 Celsius degree (° C.) in a vacuum tube furnace with argon atmosphere protection, and an annealing time is in a range of 3-5 hours (h). After annealing, the annealed aluminum foil is cooled down to room temperature with the vacuum tube furnace. An aluminum foil without heat treatment has strong internal stress, and the presence of the internal stress is not conducive to formation of highly ordered nanoholes. In order to eliminate residual stress in the aluminum foil, increase crystallinity, and improve order degree of the AAO template, a high-temperature annealing method is used to further improve performance of the alumina template (i.e., the AAO template). Hardness of the annealed aluminum foil is reduced, making it more convenient for subsequent treatment processes.

C. Wash

In order to ensure quality of the prepared nanoarray (i.e., the highly ordered nanoholes), it is necessary to ensure the quality of the alumina template, thus the annealed aluminum foil needs to be washed thoroughly. The annealed aluminum foil is cleaned with ultrasound by using acetone, anhydrous ethanol, and deionized water one by one, each cleaning time is 10 minutes (min), and grease in surfaces of the annealed aluminum foil is removed. After cleaning and drying, the dried aluminum foil is soaked into a 10% strong sodium oxide solution for 10-15 min, to remove original natural oxide layer, and then the aluminum foil removed the original natural oxide layer is continuously washed with clean water for 20-30 min until residual sodium hydroxide (NaOH) on the surface of the aluminum foil is washed thoroughly, to thereby prevent pitting corrosion during an electrochemical polishing process and breakdown during an oxidation process. The washed aluminum foil is blow dried and placed into a culture dish for later use.

D. Polishing

A solution prepared by anhydrous ethanol and perchloric acid with a volume ratio of 4:1 is used as a polishing solution, the aluminum foil obtained in the above step C is used as an anode, and graphite is used as a cathode to polish the aluminum foil obtained in the above step C at a voltage of 15-20 volts (V) for 2-5 min. Then, the polished aluminum foil is washed with deionized water to remove the polishing solution, and are blow dried with nitrogen gas to obtain a pretreated aluminum foil. The purpose of polishing is to remove an oxide layer on the surface of the aluminum foil, to improve surface brightness, and remove surface protrusions or indentations, to thereby prevent defects on the surface of the aluminum foil from affecting growth of the nanoholes, and prevent texture of the aluminum foil itself from affecting formation of an alumina film. During polishing, when the voltage is too high, the current will increase, leading to increase of solution temperature and the surface of the aluminum foil to be easily burned; when the voltage is too low, the polishing time will be extended, leading to a low production efficiency.

(2) Anodic Oxidation (Including a Primary Oxidation and a Secondary Oxidation)

A. Primary Anodic Oxidation

The pretreated aluminum foil is used as an anode, and the graphite is used as a cathode. A distance between the anode and the cathode is controlled between 60-70 mm, 0.3 moles per liter (mol/L) of oxalic acid solution is used as an electrolyte, the pretreated aluminum foil is oxidized at a voltage of 35-45 V for 5-8 h, and during oxidation, a temperature is controlled between 5-10° C.

B. Secondary Anodic Oxidation

The corroded sample (i.e., the pretreated aluminum foil after primary anodic oxidation) is washed and blow dried. The secondary anode oxidation is performed on the corroded sample, and the oxidation conditions of the secondary anodic oxidation are different from that of the primary anodic oxidation. The difference is that at the end of the reaction, the voltage is reduced from the highest point to 0 V with a step-by-step voltage reduction rate of 1 volt per second (V/s). The purpose of this step is to thin a barrier layer at a bottom of the AAO film (i.e., the alumina film) for subsequent removal.

(3) Bottom Removal and Hole Expansion

Bottom removal: the oxide film generated by the secondary oxidation has an aluminum-based. In order to obtain a complete AAO film, it is necessary to remove the bottom of the oxide film. 0.1 g/mL of copper chloride ($CuCl_2$) solution is used as a dissolution solution, and a bottom removal reaction between the aluminum-based and the $CuCl_2$ solution is expressed as follows:

$$2Al+3CuCl_2=2AlCl_3+3Cu.$$

After the reaction is complete, the AAO template is slowly taken out, and is placed into deionized water for cleaning to remove the reaction products.

Barrier layer removal and hole expansion: the AAO film without the aluminum-based is placed into a mixed solution of 0.5 weight percent (wt %) of phosphoric acid and 0.3 mol/L of oxalic acid with a temperature of 25-30° C. for hole expansion for 200-250 min, to thereby remove the barrier layer. At this time, due to capillary action, the mixed solution permeates into the holes of the AAO film without the aluminum-based, to corrode the hole wall of the AAO film without the aluminum-based, to thereby achieve hole expansion. Hole sizes of the prepared AAO film reach 450-500 nm, and a hole spacing between the holes reaches 150-200 nm.

(3) Preparation of the AAO Template

The prepared double-pass AAO template is washed, dried and soaked into anhydrous ethanol. Then the soaked double-pass AAO template is placed on a silicon (Si) wafer pre-coated with a metal conductive layer, and is suppressed with a specially designed quartz tablet pressing device, to prevent it from falling off after drying. At this time, an assembly-type AAO/Si composite template is prepared.

In step 1.2, a first nano zinc oxide film layer is electrodeposited on the AAO/Si composite template, and the step 1.2 includes the following steps (1)-(3).

In step (1), the AAO/Si composite template is used as a cathode, and a graphite plate (40×60 mm) is used as an anode.

In step (2), a zinc containing electrolyte is prepared, specifically including the follows: 3 mol/L of NaOH solution is prepared, pasty zinc oxide is added into the NaOH solution to obtain a mixed solution, the mixed solution is stirred until the mixed solution is clear to obtain the zinc containing electrolyte, and cooling the zinc containing electrolyte to room temperature for later use. In the zinc containing electrolyte, each 100 g water ($H_2O$) contains 1 g zinc oxide (ZnO).

In step (3), an equal current method is used to perform electrochemical deposition, specifically including the follows: the cathode and the anode are placed individually at about 2 centimeters (cm) away from the groove wall with a spacing of 6-8 cm, a current for the electrochemical deposition is 2.5 amperes per square decimeter ($A/dm^2$), and a time for the electrochemical deposition is 0.3-0.5 h. The ZnO in a surface of the electrochemical deposited AAO/Si composite template is cleaned thoroughly by using a nitric acid solution, and then is dried at 80° C. to obtain the first nano zinc oxide film layer with a thickness of 20-25 nm.

In step 1.3, a first nano titanium dioxide film layer is electrodeposited on the AAO/Si composite template with the first nano zinc oxide film layer, and the step 1.3 includes the following steps (1)-(3).

In step (1), the AAO/Si composite template with the first nano zinc oxide film layer is used as a cathode, and a platinum (Pt) electrode is used as an anode.

In step (2), a titanium containing electrolyte is prepared, specifically including the follows: 1 liter (L) of deionized water is poured into a beaker with a magnetic stirrer, 5 g titanium fluoride ($TiF_4$) and 5 g nickel chloride hexahydrate ($NiCl_2 \cdot 6H_2O$) are added into the beaker with the deionized water for continuously stirring at the room temperature for 30 min, to obtain a mixed solution with 0.04 mol per liter (M) of $TiF_4$ and 0.02 M of $NiCL_4$.

In step (3), the Pt electrode (i.e., the anode) and a silver/silver chloride (Ag/AgCl) electrode (i.e., a reference electrode which includes Ag and AgCl) are inserted, the AAO/Si composite template with the first nano zinc oxide film layer is adhered to a thin copper wire with silver adhesive as the cathode, and the AAO/Si composite template with the first nano zinc oxide film layer is inserted into the titanium containing electrolyte to soak about 10 min, to thereby enable the titanium containing electrolyte to enter into holes of the AAO/Si composite template with the first nano zinc oxide film layer. A deposition potential is −0.8 V to −0.4 V, and a time for the electrodeposition is 0.3-1.2 h. After depositing, the template is taken out, washed with the deionized water repeatedly, and then is soaked into the deionized water for 30 min to completely remove the titanium containing electrolyte. The template removed the titanium containing electrolyte is dried at 80° C. to obtain the first nano titanium dioxide film layer with a thickness of 15-30 nm.

In step 1.4, a magnetic nano film layer is electrodeposited on the AAO/Si composite template with the first nano zinc oxide film layer and the first nano titanium dioxide film layer, and the step 1.4 includes the following steps (1)-(3).

In step (1), the AAO/Si composite template with the first nano zinc oxide film layer and the first nano titanium dioxide film layer is used as a cathode, and the graphite is used as an anode.

In step (2), an electrodeposition solution is prepared, specifically including the follows: a solution with a total volume of 50 or 100 mL is prepared. 0.017 M of nickel sulfate hexahydrate ($NiSO_4 \cdot 6H_2O$), 0.0075 M of ferrous sulfate heptahydrate ($FeSO_4 \cdot 7H_2O$) and 0.12 M of gallium (III) sulfate octadecahydrate ($Ga_2(SO_4)_3 \cdot 18H_2O$) are used as electrodeposition main salt. 0.2 M of sodium citrate ($C_6H_5Na_3O_7 \cdot 2H_2O$) and 0.3 M of ammonium sulfate are used as a coordination agent, meanwhile, the ammonium sulfate is further used as conductive salt of the electrodeposition solution. 0.5 M of boric acid is used as a power of hydrogen (pH) buffer agent, 0.02 M of ascorbic acid is used as an antioxidant, 0.03 g/L of sodium dodecyl sulfate is used as a treating compound, and a pH of the electrodeposition solution is adjusted to 2.5-3 by using NaOH and $H_2SO_4$.

In step (3), the dual-electrode system is used to perform electrochemical deposition under the room temperature and a constant voltage, a deposition voltage is 2.5 V, and a time for the electrochemical deposition is 1.2-2.5 h. The electrodeposition solution on a surface of the template is cleaned thoroughly by using the NaOH solution, and the cleaned template is dried at 80° C. to obtain the magnetic nano film layer with a thickness of 30-50 nm.

In step 1.5, a second nano titanium dioxide film layer is electrodeposited on the AAO/Si composite template with the first nano zinc oxide film layer, the first nano titanium dioxide film layer and the magnetic nano film layer, and the step 1.5 includes the follows.

The step 1.3 is performed to obtain the second nano titanium dioxide film layer.

In step 1.6, a second nano zinc oxide film layer is electrodeposited on the AAO/Si composite template with the first nano zinc oxide film layer, the first nano titanium dioxide film layer, the magnetic nano film layer and the second nano titanium dioxide film layer, and the step 1.6 includes the follows.

The step 1.2 is performed to obtain the second nano zinc oxide film layer.

In step 1.7, the 3D magnetic photochromic nanoparticles are prepared, and the step 1.7 includes the follows.

A 3M470 electroplated tape is slowly adhered on the surface of the AAO template with the first nano zinc oxide film layer, the first nano titanium dioxide film layer, the magnetic nano film layer, the second nano titanium dioxide film layer, and the second nano zinc oxide film layer, the tape is pressed by a fingertip to be in fully contact with the AAO film, then the tape is slowly removed, the AAO template is stuck on the tape and torn off, and the remaining 3D magnetic photochromic nanoparticles are evenly arranged on the silicon wafer. The 3D magnetic photochromic nanoparticles are flaky particles with diameter of 450-500 nm and thickness of 100-160 nm at this time. The 3D magnetic photochromic nanoparticles are taken down and mixed evenly.

In step 2, the 3D magnetic anti-counterfeiting ink is prepared, and the step 2 includes the following steps (1)-(2).

In step (1), the prepared 3D magnetic photochromic nanoparticles are mixed and stirred with a pigment, a connector, a photo-initiator and an auxiliary to obtain 3D magnetic photochromic ink In step (2), 15%-25% of the 3D magnetic photochromic nanoparticles, 10%-20% of the pigment, 50%-65% of the connector, 2%-5% of the photo-initiator and 1%-6% of the auxiliary are respectively weighed according to the weight percentages, and a sum of the weight percentages of the above components is 100%. Specifically, the connector is a mixture of epoxy acrylate ($C_6H_6O_5$) and oxybis(methyl-2,1-ethanediyl) diacrylate ($C_{12}H_{18}O_5$) with a weight ratio of 1:0.85-1:0.95, the auxiliary is a mixture of a defoamer, a dispersant, and a leveling agent, the photoinitiator is at least one selected from the group consisting of 2-methyl-2-(4-morpholino)-1-[4-(methylthio)phenyl]-1-propanone ($C_{15}H_{21}NO_2S$), 1-2-hydroxy-2-methylpropiophenone ($C_{10}H_{12}O_2$), hydroxycyclohexylphenylmethanone ($C_{13}H_{16}O_2$), 2-isopropylthioxanthone ($C_{16}H_{14}OS$), 2-hydroxy-4-(octyloxy)benzophenone ($C_{21}H_{26}O_3$), 2,2-dimethoxy-2-phenylacetophenone ($C_{16}H_{16}O_3$), diphenyl(2,4,6-trimethylbenzoyl) phosphine oxide ($C_{22}H_{21}O_2P$), the pigment is one selected from the group consisting of a direct dye, a reactive dye and a reactive pigment.

In an embodiment, an additive amount of the 3D magnetic photochromic nanoparticles in the 3D magnetic ink anti-counterfeiting layer is in a range of 15-25 wt %. That is, a weight of the 3D magnetic photochromic nanoparticles accounts for 15-25% of a weight of the 3D magnetic ink anti-counterfeiting layer.

The weighed compounds in the step (2) are mixed evenly to obtain the 3D magnetic anti-counterfeiting ink.

When the consumers distinguish authenticity, they can through the following ways.

1. Visual identification: the 3D random magnetic pattern digital anti-counterfeiting label is rotated to observe a dynamic optically variable effect of the 3D magnetic anti-counterfeiting ink from different angles to thereby distinguish the authenticity. The 3D random magnetic pattern digital anti-counterfeiting label shows bright stripes under different illumination angles, it is different from disorder of ordinary magnetic ink at details of the bright stripes, due to an addition of the circular 3D magnetic photochromic particles with consistent particle size and thickness, the 3D magnetic photochromic ink adopted by the disclosure show regular circular particle patterns at the bright stripes when observing the details of the bright stripes through the naked eye or a magnifier.
2. QR code authentication: the anti-counterfeiting check code shielding layer is scratched, the anti-counterfeiting QR code area is scanned, and the anti-counterfeiting check code is input to view the product information, to thereby obtain a result of feedback product authenticity and a check code.
3. Identification by reading the anti-counterfeiting magnetic stripe information: the check code obtained by scanning the anti-counterfeiting QR code area is used as a password and is input into the magnetic card reader, the product information on the anti-counterfeiting magnetic stripe is read through the magnetic card reader, the product information on the anti-counterfeiting magnetic stripe read through the magnetic card reader is compared with the product information scanned by the QR code, when all information is consistent, the product is a genuine product.

In summary, beneficial effects of the disclosure are as follows.

1. The 3D magnetic anti-counterfeiting ink of the disclosure uses the AAO/Si composite template as the cathode substrate, and uniform distribution of magnetic layers, metal film layers, and inorganic film layers within ordered nanoholes on the substrate is achieved through electroplating. Compared to methods such as magnetron sputtering, vapor deposition, and evaporation to form the magnetic and functional films, the preparation method of the disclosure is more efficient and convenient. The sizes of the film-forming particles are consistent, and the film thicknesses are consistent. Moreover, complex steps of sputtering the magnetic film before smashing it into nanoparticles through the shear force are reduced, damage of the shear force on the surface of the film is avoided, thereby avoiding inconsistency of the surface of the film affecting the consistency of light refraction, absorption, and diffraction, causing the problem that the optically variable bright stripes on the label surface is not obvious with different light angles.
2. The 3D random magnetic pattern digital anti-counterfeiting label is rotated to observe the dynamic optically variable effect of the 3D magnetic anti-counterfeiting ink from different angles to thereby distinguish the authenticity. The 3D random magnetic pattern digital anti-counterfeiting label shows bright stripes under different illumination angles, it is different from disorder of ordinary magnetic ink at details of the bright stripes, due to the addition of the circular 3D magnetic photochromic particles with consistent particle size and thickness, the 3D magnetic photochromic ink adopted by the disclosure show regular circular particle patterns at the bright stripes when observing the details of the bright stripes through the naked eye or the magnifier.
3. The 3D magnetic ink anti-counterfeiting layer of the disclosure is obtained by screen printing the 3D magnetic anti-counterfeiting ink on the PET plastic film layer, and performing magnetic fixation and UV curable on the 3D magnetic anti-counterfeiting ink, to rearrange and orient the 3D magnetic photochromic nanoparticles in the 3D magnetic anti-counterfeiting ink, to thereby achieve the magnetic photochromic effect that the 3D magnetic ink anti-counterfeiting layer generates 3D flicker and color changes from different perspectives. Therefore, the random magnetic pattern digital anti-counterfeiting label of the disclosure is not easily counterfeited, and has good anti-counterfeiting effect.
4. The 3D magnetic ink anti-counterfeiting layer of the 3D random magnetic pattern digital anti-counterfeiting label of the disclosure includes the anti-counterfeiting magnetic stripe area for writing the product information, and the anti-counterfeiting magnetic stripe area is combined with the anti-counterfeiting QR code. The product information is viewed through scanning the anti-counterfeiting QR code and inputting the anti-counterfeiting check code, to obtain the result of feedback product authenticity and the check code. The product information on the anti-counterfeiting magnetic stripe read through the magnetic card reader is compared with the product information scanned by the QR code, to further verify the authenticity of the product, which greatly improves fake difficulty.
5. The bottom of the anti-counterfeiting magnetic stripe area is not coated with the adhesive layer, and the left and right sides and the lower part of the anti-counterfeiting magnetic stripe area are die-cut, which is convenient for uncovering the anti-counterfeiting magnetic stripe area when the magnetic card reader needs to read data. When the anti-counterfeiting magnetic stripe area is lifted, it cannot be restored to its original appearance, which can effectively prevent counterfeiting.
6. The check code obtained by scanning the anti-counterfeiting QR code area is a random code sent from the system, the check code is used as the password read by the anti-counterfeiting magnetic stripe area, which has randomness and time constraints, and can effectively avoid counterfeiting.

LIST OF REFERENCE NUMBERS

1—release film layer; 2—adhesive layer; 3—PET plastic film layer; 4—3D magnetic ink anti-counterfeiting layer; 41—anti-counterfeiting magnetic stripe area; 42—anti-counterfeiting QR code area; 5—printing layer; 51—LOGO area; 52—anti-counterfeiting check code area; 6—anti-scratch protective layer; 7—anti-counterfeiting check code shielding layer; 81—first nano zinc oxide film layer; 82—first nano titanium dioxide film layer; 83—magnetic nano film layer; 84—second nano titanium dioxide film layer; 85—second nano zinc oxide film layer.

DETAILED DESCRIPTION OF EMBODIMENTS

Embodiments of the disclosure are further described in conjunction with drawings below.

Embodiment 1

Figure 1:
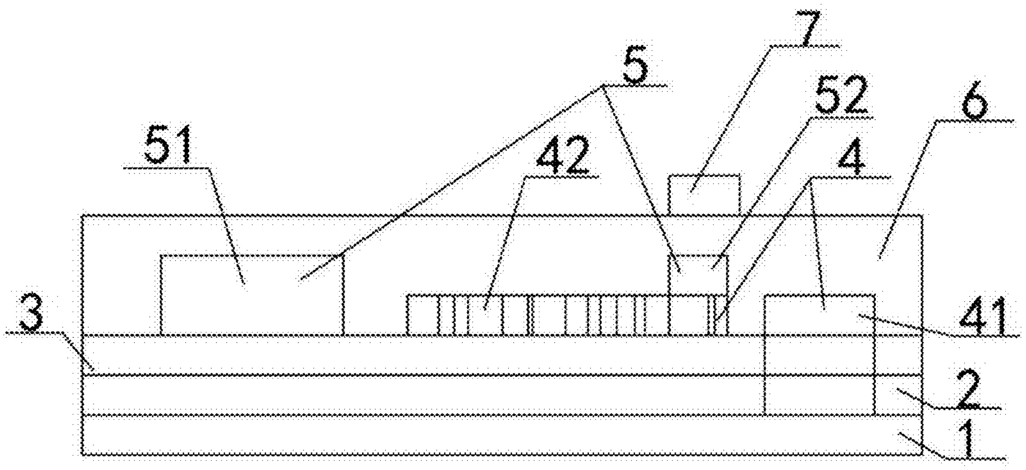
FIG. 1 illustrates a schematic diagram of a layer structure of a 3D random magnetic pattern digital anti-counterfeiting label according to an embodiment of the disclosure.
Figure 2:
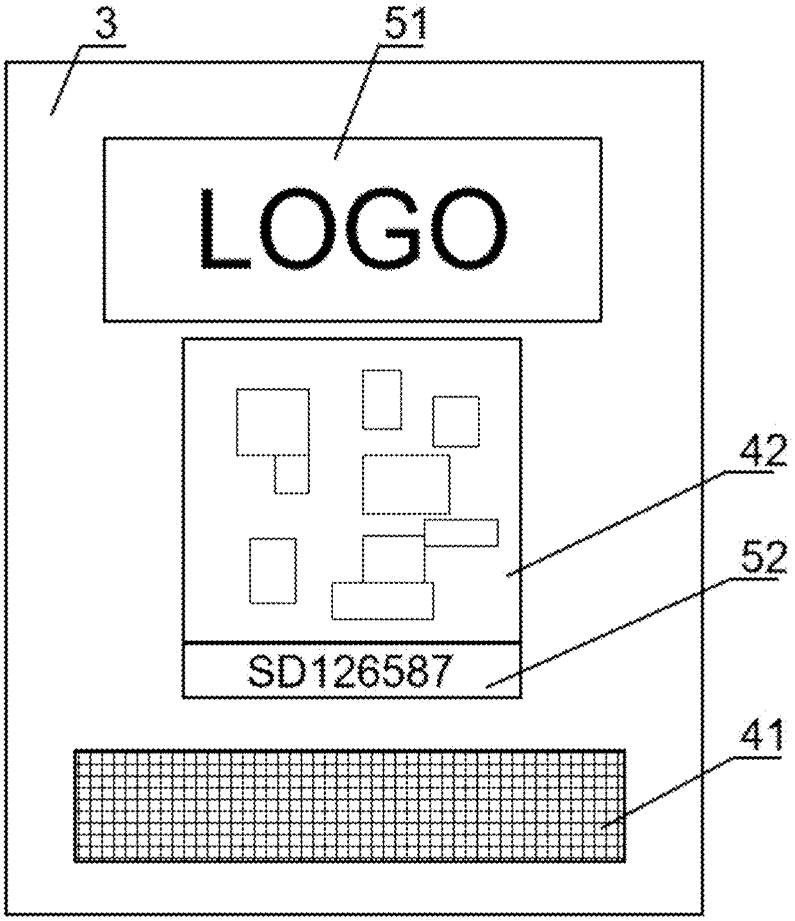
FIG. 2 illustrates a schematic diagram of a planar structure of the 3D random magnetic pattern digital anti-counterfeiting label according to an embodiment of the disclosure.
Figure 3:
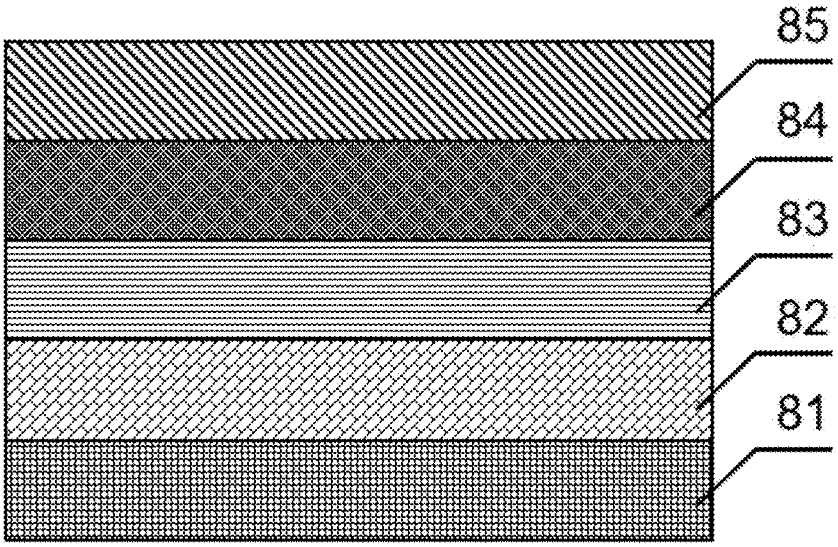
FIG. 3 illustrates a schematic structural diagram of a 3D magnetic photochromic nanoparticle of the 3D random magnetic pattern digital anti-counterfeiting label according to an embodiment of the disclosure.

As shown in FIG. 1, the 3D random magnetic pattern digital anti-counterfeiting label sequentially includes: a release film layer 1, an adhesive layer 2, a PET plastic film layer 3, a 3D magnetic ink anti-counterfeiting layer 4, a printing layer 5, an anti-scratch protective layer 6 and an anti-counterfeiting check code shielding layer 7 from bottom to top.

Specifically, the release layer 1 is made of PET material, and a thickness of the release layer 1 is 0.05 mm. A coating amount of the adhesive layer 2 is 20 g/$m^2$. A thickness of the PET plastic film layer 3 is 0.2 mm.

The 3D magnetic ink anti-counterfeiting layer 4 is obtained by printing 3D magnetic anti-counterfeiting ink on the PET plastic film layer, and performing magnetic fixation and photocuring on the 3D magnetic anti-counterfeiting ink to rearrange and orient 3D magnetic photochromic nanoparticles in the 3D magnetic anti-counterfeiting ink, to thereby achieve a magnetic photochromic effect that the 3D magnetic ink anti-counterfeiting layer generates 3D flicker and color changes from different perspectives.

Specifically, the 3D magnetic ink anti-counterfeiting layer 4 includes: an anti-counterfeiting magnetic stripe area 41 and an anti-counterfeiting QR code area 42 for writing and reading product information. The anti-counterfeiting magnetic stripe area 41 is located at a lower end of the 3D random magnetic pattern digital anti-counterfeiting label, which is convenient for a magnetic card reader to write and read the product information. A bottom of the anti-counterfeiting magnetic stripe area 41 is not coated with the adhesive layer 2, and left and right sides and a lower part of the anti-counterfeiting magnetic stripe area 41 are die-cut, which is convenient for uncovering the anti-counterfeiting magnetic stripe area 41 when the magnetic card reader needs to read data.

The anti-counterfeiting magnetic stripe area 41 is obtained by printing the 3D magnetic anti-counterfeiting ink, coating a 300 mesh anilox roller, and curing with a UV lamp.

The anti-counterfeiting QR code area 42 is obtained by printing the 3D magnetic anti-counterfeiting ink, coating a 310 mesh anilox roller, and curing with the UV lamp.

The printing layer 5 is printed with a LOGO of company and an anti-counterfeiting check code, and the LOGO of company and the anti-counterfeiting check code are located on a LOGO area 51 and an anti-counterfeiting check code area 52 of the printing layer 5 respectively. The anti-counterfeiting check code area 52 is located at a bottom of a surface area of the anti-counterfeiting QR code area 42.

The anti-scratch protective layer 6 is a precoated protective layer or a UV varnish protective layer. Specifically, the anti-scratch protective layer 6 is the UV varnish protective layer, which has a good adhesion with the printing layer 5, and a strong adhesion with the 3D magnetic ink anti-counterfeiting layer 4. The UV varnish protective layer is obtained by coating printable UV varnish UV-503. Specifically, the UV-503 is a commercially available product of Dongguan EONLEO Chemical technology Co., Ltd. The anti-scratch protective layer 6 is obtained by coating a 320 mesh anilox roller, and curing with the UV lamp.

The anti-counterfeiting check code shielding layer 7 is obtained by screen printing scratch-off ink on the anti-scratch protective layer 6, and the scratch-off ink is LD-S50866 series water-based scratch-off ink from Guangzhou Ledi New Materials Technology Co., Ltd.

The preparation method of the 3D random magnetic pattern digital anti-counterfeiting label described by the disclosure includes the following steps 1-8.

In step 1, the 3D magnetic ink anti-counterfeiting layer 4 is prepared by screen printing the anti-counterfeiting magnetic stripe area 41 and the anti-counterfeiting QR code area 42 of the 3D magnetic ink anti-counterfeiting layer 4 on the PET plastic film layer 3 with the 3D magnetic anti-counterfeiting ink, and performing magnetic fixation with a magnet and UV curable on the 3D magnetic anti-counterfeiting ink, to rearrange and orient the 3D magnetic photochromic nanoparticles in the 3D magnetic anti-counterfeiting ink, to thereby achieve the magnetic photochromic effect that the 3D magnetic ink anti-counterfeiting layer 5 generates 3D flicker and color changes from different perspectives. The magnetic fixation and UV curable are commonly used technologies in the art, and are not be described in detail here.

In step 2, the printing layer 5 is prepared by inkjet printing the LOGO of company, the anti-counterfeiting check code and other information on surfaces of the PET plastic film layer 3 and the 3D magnetic ink anti-counterfeiting layer 4 respectively. The anti-counterfeiting check code is printed on the bottom of the surface area of the anti-counterfeiting QR code area 42, and the LOGO of company is printed above the anti-counterfeiting QR code area 42.

In step 3, the anti-scratch protective layer 6 is prepared by coating the UV varnish on surfaces of the PET plastic film layer 3 and the 3D magnetic ink anti-counterfeiting layer 4, and photocuring the UV varnish.

In step 4, the anti-counterfeiting check code shielding layer 7 is prepared by screen printing the scratch-off ink on a surface of the anti-counterfeiting check code area 52, and hot air drying the scratch-off ink.

In step 5, product information is written through the anti-counterfeiting magnetic stripe area 41 of the 3D magnetic ink anti-counterfeiting layer 4.

In step 6, an adhesive is coated on a bottom of the PET plastic film layer 3 to obtain the adhesive layer 2.

In step 7, a release film layer 1 is covered on the bottom of the PET plastic film layer 3 after coating the adhesive.

In step 8, the left and right sides, and the lower part of the anti-counterfeiting magnetic stripe area 41 on the PET plastic film layer 3 are die-cut to obtain the 3D random magnetic pattern digital anti-counterfeiting label.

Specifically, a preparation method of the 3D magnetic anti-counterfeiting ink includes the following steps 1-2.

In step 1, the 3D magnetic photochromic nanoparticles are prepared, and the step 1 specifically includes the following steps 1.1-1.7.

In step 1.1, an AAO template is prepared.

(1) Pre-Treatment of an Aluminum Foil

A. Cutting and Flattening

The aluminum foil with a thickness of 800 nm is cut into circular pieces with a diameter of 20 mm before using, so that they are suitable for a diameter of an electrolytic cell used during oxidation. In order to reduce uneven stress distribution caused by uneven cutting, the circular pieces are flattened by using a tablet press, and a pressure of the tablet press is controlled between 1.3-2 MPa.

B. Annealing

Each flattened aluminum foil (i.e., the circular pieces) is annealed at 400-500° C. in a vacuum tube furnace with argon atmosphere protection, and an annealing time is in a range of 3-5 h. After annealing, the annealed aluminum foil is cooled down to room temperature with the furnace. An aluminum foil without heat treatment has strong internal stress, and the presence of the internal stress is not conducive to formation of highly ordered nanoholes. In order to eliminate residual stress in the aluminum foil, increase crystallinity, and improve order degree of the AAO template, a high-temperature annealing method is used to further improve performance of the alumina template (i.e., the AAO template). Hardness of the annealed aluminum foil is reduced, making it more convenient for subsequent treatment processes.

C. Wash

In order to ensure quality of the prepared nanoarray (i.e., the highly ordered nanoholes), it is necessary to ensure the quality of the alumina template, thus the annealed aluminum foil needs to be washed thoroughly. The annealed aluminum foil is cleaned with ultrasound by using acetone, anhydrous ethanol, and deionized water one by one, each cleaning time is 10 min, and grease in surface of the annealed aluminum foil is removed. After cleaning and drying, the dried aluminum foil is soaked into a 10% strong sodium oxide solution for 10-15 min, to remove original natural oxide layer, and then the aluminum foil removed the original natural oxide layer is continuously washed with clean water for 20-30 min until residual NaOH on the surface of the aluminum foil is washed thoroughly, to thereby prevent pitting corrosion during an electrochemical polishing process and breakdown during an oxidation process. The washed aluminum foil is blow dried and placed into a culture dish for later use.

D. Polishing

A solution prepared by anhydrous ethanol and perchloric acid with a volume ratio of 4:1 is used as a polishing solution, the aluminum foil obtained in the above step C is used as an anode, and graphite is used as a cathode to polish the aluminum foil obtained in the above step C at a voltage of 15-20 V for 2-5 min. Then, the polished aluminum foil is washed with deionized water to remove the polishing solution, and is blow dried with nitrogen gas to obtain a pretreated aluminum foil. The purpose of polishing is to remove an oxide layer on the surface of the aluminum foil, to improve surface brightness, and remove surface protrusions or indentations, to thereby prevent defects on the surface of aluminum foil from affecting growth of the nanoholes, and prevent texture of the aluminum foil itself from affecting formation of an alumina film. During polishing, when the voltage is too high, the current will increase, leading to increase of solution temperature and the surfaces of the aluminum foil to be easily burned; when the voltage is too low, the polishing time will be extended, leading to a low production efficiency.

(2) Anodic Oxidation (Including a Primary Oxidation and a Secondary Oxidation)

A. Primary Anodic Oxidation

The pretreated aluminum foil is used as an anode, and the graphite is used as a cathode. A distance between the anode and the cathode is controlled between 60-70 mm, 0.3 mol/L of oxalic acid solution is used as an electrolyte, the pretreated aluminum foil is oxidized at a voltage of 35-45 V for 5-8 h, and during oxidation, a temperature is controlled between 5-10° C.

B. Secondary Anodic Oxidation

The corroded sample (i.e., the pretreated aluminum foil after primary anodic oxidation) is washed and blow dried. The secondary anode oxidation is performed on the corroded sample, and the oxidation conditions of the secondary anodic oxidation are different from that of the primary anodic oxidation. The difference is that at the end of the reaction, the voltage is reduced from the highest point to 0 V with a step-by-step voltage reduction rate of 1 V/s. The purpose of this step is to thin a barrier layer at a bottom of the AAO film (i.e., the alumina film) for subsequent removal.

(3) Bottom Removal and Hole Expansion

Bottom removal: the oxide film generated by the secondary oxidation has an aluminum-based. In order to obtain a complete AAO film, it is necessary to remove the bottom of the oxide film. 0.1 g/mL of $CuCl_2$ solution is used as a dissolution solution, and a bottom removal reaction between the aluminum-based and the $CuCl_2$ solution is expressed as follows:

$$2Al+3CuCl_2=2AlCl_3+3Cu.$$

After the reaction is complete, the AAO template is slowly taken out, and is placed into deionized water for cleaning to remove the reaction products.

Barrier layer removal and hole expansion: the AAO film without the aluminum-based is placed into a mixed solution of 0.5 wt % of phosphoric acid and 0.3 mol/L of oxalic acid with a temperature of 25-30° C. for hole expansion for 200-250 min, to thereby remove the barrier layer. At this time, due to capillary action, the mixed solution permeates into the holes of the AAO film without the aluminum-based, to corrode the hole wall of the AAO film without the aluminum-based, to thereby achieve hole expansion. Hole sizes of the prepared AAO film reach 450-500 nm, and a hole spacing between the holes reaches 150-200 nm.

(3) Preparation of the AAO Template

The prepared double-pass AAO template is washed, dried and soaked into anhydrous ethanol. Then the soaked double-pass AAO template is placed on a silicon (Si) wafer pre-coated with a metal conductive layer, and is suppressed with a specially designed quartz tablet pressing device, to prevent it from falling off after drying. At this time, an assembly-type AAO/Si composite template is prepared.

In step 1.2, a first nano zinc oxide film layer is electrodeposited on the AAO/Si composite template, and the step 1.2 includes the following steps (1)-(3).

In step (1), the AAO/Si composite template is used as a cathode, and a graphite plate (40×60 mm) is used as an anode.

In step (2), a zinc containing electrolyte is prepared, specifically including the follows: 3 mol/L of NaOH solution is prepared, pasty zinc oxide is added into the NaOH solution to obtain a mixed solution, the mixed solution is stirred until the mixed solution is clear to obtain the zinc containing electrolyte, and the zinc containing electrolyte is cooled to room temperature for later use. In the zinc containing electrolyte, each 100 g $H_2O$ contains 1 g ZnO.

In step (3), an equal current method is used to perform electrochemical deposition, specifically including the follows: the cathode and the anode are placed individually at about 2 cm away from the groove wall with a spacing of 6-8 cm, a current for the electrochemical deposition is 2.5 $A/dm^2$, and a time for the electrochemical deposition is 0.3-0.5 h. The ZnO in a surface of the electrochemical deposited AAO/Si composite template is cleaned thoroughly by using a nitric acid solution, and then is dried at 80° C. to obtain the first nano zinc oxide film layer with a thickness of 20-25 nm.

In step 1.3, a first nano titanium dioxide film layer is electrodeposited on the AAO/Si composite template with the first nano zinc oxide film layer, and the step 1.3 includes the following steps (1)-(3).

In step (1), the AAO/Si composite template with the first nano zinc oxide film layer is used as a cathode, and a Pt electrode is used as an anode.

In step (2), a titanium containing electrolyte is prepared, specifically including the follows: 1 L of deionized water is poured into a beaker with a magnetic stirrer, 5 g $TiF_4$ and 5 g $NiCl_2 \cdot 6H_2O$ are added into the beaker with the deionized water for continuously stirring at the room temperature for 30 min, to obtain a mixed solution with 0.04 M of $TiF_4$ and 0.02 M of $NiCL_4$.

In step (3), the Pt electrode (i.e., the anode) and an Ag/AgCl electrode (i.e., a reference electrode which includes Ag and AgCl) are inserted, the AAO/Si composite template with the first nano zinc oxide film layer is adhered to a thin copper wire with silver adhesive as the cathode, and the AAO/Si composite template with the first nano zinc oxide film layer is inserted into the titanium containing electrolyte to soak about 10 min, to thereby enable the titanium containing electrolyte to enter into holes of the AAO/Si composite template with the first nano zinc oxide film layer. A deposition potential is −0.8 V to −0.4 V, and a time for the electrodeposition is 0.3-1.2 h. After depositing, the template is taken out, washed with the deionized water repeatedly, and then is soaked into the deionized water for 30 min to completely remove the titanium containing electrolyte. The template removed the titanium containing electrolyte is dried at 80° C. to obtain the first nano titanium dioxide film layer with a thickness of 15-30 nm.

In step 1.4, a magnetic nano film layer is electrodeposited on the AAO/Si composite template with the first nano zinc oxide film layer and the first nano titanium dioxide film layer, and the step 1.4 includes the following steps (1)-(3).

In step (1), the AAO/Si composite template with the first nano zinc oxide film layer and the first nano titanium dioxide film layer is used as a cathode, and the graphite is used as an anode.

In step (2), an electrodeposition solution is prepared, specifically including the follows: a solution with a total volume of 50 or 100 mL is prepared. 0.017 M of $NiSO_4 \cdot 6H_2O$, 0.0075 M of $FeSO_4 \cdot 7H_2O$ and 0.12 M of $Ga_2(SO_4)_3 \cdot 18H_2O$ are used as electrodeposition main salt. 0.2 M of $C_6H_5Na_3O_7 \cdot 2H_2O$ and 0.3 M of ammonium sulfate are used as a coordination agent, meanwhile, the ammonium sulfate is further used as a conductive salt of the electrodeposition solution. 0.5 M boric acid is used as a pH buffer agent, 0.02 M ascorbic acid is used as an antioxidant, 0.03 g/L sodium dodecyl sulfate is used as a treating compound, and a pH of the electrodeposition solution is adjusted to 2.5-3 by using NaOH and $H_2SO_4$.

In step (3), the dual-electrode system is used to perform electrochemical deposition under the room temperature and a constant voltage, a deposition voltage is 2.5 V, and a time for the electrochemical deposition is 1.2-2.5 h. The electrodeposition solution on a surface of the template is cleaned thoroughly by using the NaOH solution, and the cleaned template is dried at 80° C. to obtain the magnetic nano film layer with a thickness of 30-50 nm.

In step 1.5, a second nano titanium dioxide film layer is electrodeposited on the AAO/Si composite template with the first nano zinc oxide film layer, the first nano titanium dioxide film layer and the magnetic nano film layer, and the step 1.5 includes the follows.

The step 1.3 is performed to obtain the second nano titanium dioxide film layer.

In step 1.6, a second nano zinc oxide film layer is electrodeposited on the AAO/Si composite template with the first nano zinc oxide film layer, the first nano titanium dioxide film layer, the magnetic nano film layer and the second nano titanium dioxide film layer, and the step 1.6 includes the follows.

The step 1.2 is performed to obtain the second nano zinc oxide film layer.

In step 1.7, the 3D magnetic photochromic nanoparticles are prepared, and the step 1.7 includes the follows.

A 3M470 electroplated tape is slowly adhered on the surface of the AAO template with the first nano zinc oxide film layer, the first nano titanium dioxide film layer, the magnetic nano film layer, the second nano titanium dioxide film layer, and the second nano zinc oxide film layer, the tape is pressed by a fingertip to be in fully contact with the AAO film, then the tape is slowly removed, the AAO template is stuck on the tape and torn off, and the remaining 3D magnetic photochromic nanoparticles are evenly arranged on the silicon wafer. The 3D magnetic photochromic nanoparticles are flaky particles with diameter of 450-500 nm and thickness of 100-160 nm at this time. The 3D magnetic photochromic nanoparticles are taken down and mixed evenly.

In step 2, the 3D magnetic anti-counterfeiting ink is prepared, and the step 2 includes the following steps (1)-(2).

(1) The prepared 3D magnetic photochromic nanoparticles are mixed and stirred with a pigment, a connector, a photo-initiator and an auxiliary to obtain 3D magnetic photochromic ink.

(2) 18% of the 3D magnetic photochromic nanoparticles, 12% of the pigment, 51% of the connector, 4% of the photo-initiator and 5% of the auxiliary are respectively weighed according to the weight percentages, and a sum of the weight percentages of the above components is 100%. Specifically, the connector is a mixture of epoxy acrylate and oxybis(methyl-2,1-ethanediyl) diacrylate with a weight ratio of 1:0.85, the auxiliary is a mixture of a defoamer, a dispersant, and a leveling agent, the photo-initiator is 2-methyl-2-(4-morpholino)-1-[4-(methylthio)phenyl]-1-propanone, the pigment is benzidine yellow G ($C_{32}H_{26}Cl_2N_6O_4$).

The weighed compounds in the step (2) are mixed evenly to obtain the 3D magnetic anti-counterfeiting ink.

Embodiment 2

As shown in FIG. 1, the 3D random magnetic pattern digital anti-counterfeiting label sequentially includes: a release film layer 1, an adhesive layer 2, a PET plastic film layer 3, a 3D magnetic ink anti-counterfeiting layer 4, a printing layer 5, an anti-scratch protective layer 6 and an anti-counterfeiting check code shielding layer 7 from bottom to top.

Specifically, the release layer 1 is made of PE material, and a thickness of the release layer 1 is 0.15 mm. A coating amount of the adhesive layer 2 is 26 g/m$^2$. A thickness of the PET plastic film layer 3 is 0.5 mm.

The 3D magnetic ink anti-counterfeiting layer 4 is obtained by printing 3D magnetic anti-counterfeiting ink on the PET plastic film layer, and performing magnetic fixation and photocuring on the 3D magnetic anti-counterfeiting ink to rearrange and orient 3D magnetic photochromic nanoparticles in the 3D magnetic anti-counterfeiting ink, to thereby achieve a magnetic photochromic effect that the 3D magnetic ink anti-counterfeiting layer generates 3D flicker and color changes from different perspectives.

Specifically, the 3D magnetic ink anti-counterfeiting layer 4 includes: an anti-counterfeiting magnetic stripe area 41 and an anti-counterfeiting QR code area 42 for writing and reading product information. The anti-counterfeiting magnetic stripe area 41 is located at a lower end of the 3D random magnetic pattern digital anti-counterfeiting label, which is convenient for a magnetic card reader to write and read the product information. A bottom of the anti-counterfeiting magnetic stripe area 41 is not coated with the adhesive layer 2, and left and right sides and a lower part of the anti-counterfeiting magnetic stripe area 41 are die-cut, which is convenient for uncovering the anti-counterfeiting magnetic stripe area 41 when the magnetic card reader needs to read data.

The anti-counterfeiting magnetic stripe area 41 is obtained by printing the 3D magnetic anti-counterfeiting ink, coating a 350 mesh anilox roller, and curing with a UV lamp.

The anti-counterfeiting QR code area 42 is obtained by printing the 3D magnetic anti-counterfeiting ink, coating a 310 mesh anilox roller, and curing with the UV lamp.

The printing layer 5 is printed with a LOGO of company and an anti-counterfeiting check code, and the LOGO of company and the anti-counterfeiting check code are located on a LOGO area 51 and an anti-counterfeiting check code area 52 of the printing layer 5 respectively. The anti-counterfeiting check code area 52 is located a bottom of a surface area of the anti-counterfeiting QR code area 42.

The anti-scratch protective layer 6 is a precoated protective layer or a UV varnish protective layer. Specifically, the anti-scratch protective layer 6 is the UV varnish protective layer, which has a good adhesion with the printing layer 5, and a strong adhesion with the 3D magnetic ink anti-counterfeiting layer 4. The UV varnish protective layer is obtained by coating printable UV varnish UV-503. Specifically, the UV-503 is a commercially available product of Dongguan EONLEO Chemical technology Co., Ltd. The anti-scratch protective layer 6 is obtained by coating a 320 mesh anilox roller, and curing with the UV lamp.

The anti-counterfeiting check code shielding layer 7 is obtained by screen printing scratch-off ink on the anti-scratch protective layer 6, and the scratch-off ink is SO74 series screen printing scratch-off ink from Dongguan Kaiyue Environmental Protection Technology Co., Ltd.

The preparation method of the 3D random magnetic pattern digital anti-counterfeiting label described by the disclosure includes the following steps.

In step 1, the 3D magnetic ink anti-counterfeiting layer 4 is prepared by screen printing the anti-counterfeiting magnetic stripe area 41 and the anti-counterfeiting QR code area 42 of the 3D magnetic ink anti-counterfeiting layer 4 on the PET plastic film layer 3 with the 3D magnetic anti-counterfeiting ink, and performing magnetic fixation with a magnet and UV curable on the 3D magnetic anti-counterfeiting ink, to rearrange and orient the 3D magnetic photochromic nanoparticles in the 3D magnetic anti-counterfeiting ink, to thereby achieve the magnetic photochromic effect that the 3D magnetic ink anti-counterfeiting layer 5 generates 3D flicker and color changes from different perspectives.

In step 2, the printing layer 5 is prepared by inkjet printing the LOGO of company, the anti-counterfeiting check code and other information on surfaces of the PET plastic film layer 3 and the 3D magnetic ink anti-counterfeiting layer 4 respectively. The anti-counterfeiting check code is printed on the bottom of the surface area of the anti-counterfeiting QR code area 42, and the LOGO of company is printed above the anti-counterfeiting QR code area 42.

In step 3, the anti-scratch protective layer 6 is prepared by coating the UV varnish on surfaces of the PET plastic film layer 3 and the 3D magnetic ink anti-counterfeiting layer 4, and photo-curing the UV varnish.

In step 4, the anti-counterfeiting check code shielding layer 7 is prepared by screen printing the scratch-off ink on a surface of the anti-counterfeiting check code area 52, and hot air drying the scratch-off ink.

In step 5, product information is written through the anti-counterfeiting magnetic stripe area 41 of the 3D magnetic ink anti-counterfeiting layer 4.

In step 6, an adhesive is coated on a bottom of the PET plastic film layer 3 to obtain the adhesive layer 2.

In step 7, a release film layer 1 is covered on the bottom of the PET plastic film layer 3 after coating the adhesive.

In step 8, the left and right sides, and the lower part of the anti-counterfeiting magnetic stripe area 41 on the PET plastic film layer 3 are die-cut to obtain the 3D random magnetic pattern digital anti-counterfeiting label.

Specifically, a preparation method of the 3D magnetic anti-counterfeiting ink includes the following steps 1-2.

In step 1, the 3D magnetic photochromic nanoparticles are prepared, and the step 1 specifically includes the following steps 1.1-1.7.

In step 1.1, an AAO template is prepared.

(1) Pre-Treatment of an Aluminum Foil

A. Cutting and Flattening

The aluminum foil with a thickness of 800 nm is cut into circular pieces with a diameter of 20 mm before using, so that they are suitable for a diameter of an electrolytic cell used during oxidation. In order to reduce uneven stress distribution caused by uneven cutting, the circular pieces are flattened by using a tablet press, and a pressure of the tablet press is controlled between 1.3-2 MPa.

B. Annealing

Each flattened aluminum foils (i.e., the circular pieces) is annealed at 400-500° C. in a vacuum tube furnace with argon atmosphere protection, and an annealing time is in a range of 3-5 h. After annealing, the annealed aluminum foil is cooled down to room temperature with the furnace. An aluminum foil without heat treatment has strong internal stress, and the presence of the internal stress is not conducive to formation of highly ordered nanoholes. In order to eliminate residual stress in the aluminum foil, increase crystallinity, and improve order degree of the AAO template, a high-temperature annealing method is used to further improve performance of the alumina template (i.e., the AAO template). Hardness of the annealed aluminum foil is reduced, making it more convenient for subsequent treatment processes.

C. Wash

In order to ensure quality of the prepared nanoarray (i.e., the highly ordered nanoholes), it is necessary to ensure the quality of the alumina template, thus the annealed aluminum foils need to be washed thoroughly. The annealed aluminum foil is cleaned by ultrasound by using acetone, anhydrous ethanol, and deionized water one by one, each cleaning time is 10 min, and grease in surface of the aluminum foil is removed. After cleaning and drying, the dried aluminum foil is soaked into a 10% strong sodium oxide solution for 10-15 min, to remove original natural oxide layer, and then the aluminum foil removed the original natural oxide layer is continuously washed with clean water for 20-30 min until residual NaOH on the surface of the aluminum foil is washed thoroughly, to thereby prevent pitting corrosion during an electrochemical polishing process and breakdown during an oxidation process. The washed aluminum foil is blow dried and placed into a culture dish for later use.

D. Polishing

A solution prepared by anhydrous ethanol and perchloric acid with a volume ratio of 4:1 is used as a polishing solution, the aluminum foil obtained in the above step C is used as an anode, and graphite is used as a cathode to polish the aluminum foil obtained in the above step C at a voltage of 15-20 V for 2-5 min. Then, the polished aluminum foil is washed with deionized water to remove the polishing solution, and is blow dried with nitrogen gas to obtain a pretreated aluminum foil. The purpose of polishing is to remove an oxide layer on the surface of the aluminum foil, to improve surface brightness, and remove surface protrusions or indentations, to thereby prevent defects on the surface of aluminum foil from affecting growth of nanoholes, and prevent texture of the aluminum foil itself from affecting formation of an alumina film. During polishing, when the voltage is too high, the current will increase, which will lead to increase of solution temperature and the surfaces of the aluminum foils will be easily burned; when the voltage is too low, the polishing time will be extended, which leads to a low production efficiency.

(2) Anodic Oxidation (Including a Primary Oxidation and a Secondary Oxidation)

A. Primary Anodic Oxidation

The pretreated aluminum foil is used as an anode, and the graphite is used as a cathode. A distance between the anode and the cathode is controlled between 60-70 mm, 0.3 mol/L of oxalic acid solution is used as an electrolyte, the pretreated aluminum foil is oxidized at a voltage of 35-45 V for 5-8 h, and during oxidation, a temperature is controlled between 5-10° C.

B. Secondary Anodic Oxidation

The corroded sample (i.e., the pretreated aluminum foil after primary anodic oxidation) is washed and blow dried. The secondary anodic oxidation is performed on the corroded sample, and the oxidation conditions of the secondary anodic oxidation are different from that of the primary anodic oxidation. The difference is that at the end of the reaction, the voltage is reduced from the highest point to 0 V with a step-by-step voltage reduction rate of 1 V/s. The purpose of this step is to thin a barrier layer at a bottom of the AAO film for subsequent removal.

(3) Bottom Removal and Hole Expansion

Bottom removal: the oxide film generated by the secondary oxidation has an aluminum-based. In order to obtain a complete AAO film, it is necessary to remove the bottom. 0.1 g/mL of $CuCl_2$ solution is used as a dissolution solution, and a bottom removal reaction between the aluminum-based and the $CuCl_2$ solution is expressed as follows:

$$2Al+3CuCl_2=2AlCl_3+3Cu.$$

After the reaction is complete, the AAO template is slowly taken out, and is placed into deionized water for cleaning to remove the reaction products.

Barrier layer removal and hole expansion: the AAO film without the aluminum-based is placed into a mixed solution of 0.5 wt % of phosphoric acid and 0.3 mol/L of oxalic acid with a temperature of 25-30° C. for hole expansion for 200-250 min, to thereby remove the barrier layer. At this time, due to capillary action, the mixed solution permeates into the holes of the AAO film without the aluminum-based, to corrode the hole wall of the AAO film without the aluminum-based, to thereby achieve hole expansion. Hole sizes of the prepared AAO film reach 450-500 nm, and a hole spacing between the holes reaches 150-200 nm.

(3) Preparation of the AAO Template

The prepared double-pass AAO template is washed, dried and soaked into anhydrous ethanol. Then the soaked double-pass AAO template is placed on a silicon (Si) wafer precoated with a metal conductive layer, and is suppressed with a specially designed quartz tablet pressing device, to prevent it from falling off after drying. At this time, an assembly-type AAO/Si composite template is prepared.

In step 1.2, a first nano zinc oxide film layer is electrodeposited on the AAO/Si composite template, and the step 1.2 includes the following steps (1)-(3).

In step (1), the AAO/Si composite template is used as a cathode, and a graphite plate (40×60 mm) is used as an anode.

In step (2), a zinc containing electrolyte is prepared, specifically including the follows: 3 mol/L of NaOH solution is prepared, pasty zinc oxide is added into the NaOH solution to obtain a mixed solution, the mixed solution is stirred until the mixed solution is clear to obtain the zinc containing electrolyte, and the zinc containing electrolyte is cooled to room temperature for later use. In the zinc containing electrolyte, each 100 g $H_2O$ contains 1 g ZnO.

In step (3), an equal current method is used to perform electrochemical deposition, specifically including the follows: the cathode and the anode are placed individually at about 2 cm away from the groove wall with a spacing of 6-8 cm, a current for the electrochemical deposition is 2.5 A/dm$^2$, and a time for the electrochemical deposition is 0.3-0.5 h. The ZnO in a surface of the electrochemical deposited AAO/Si composite template is cleaned thoroughly by using a nitric acid solution, and then is dried at 80° C. to obtain the first nano zinc oxide film layer with a thickness of 20-25 nm.

In step 1.3, a first nano titanium dioxide film layer is electrodeposited on the AAO/Si composite template with the first nano zinc oxide film layer, and the step 1.3 includes the following steps (1)-(3).

In step (1), the AAO/Si composite template with the first nano zinc oxide film layer is used as a cathode, and a Pt electrode is used as an anode.

In step (2), a titanium containing electrolyte is prepared, specifically including the follows: 1 L of deionized water is poured into a beaker with a magnetic stirrer, 5 g $TiF_4$ and 5 g $NiCl_2 \cdot 6H_2O$ are added into the beaker with the deionized water for continuously stirring at the room temperature for 30 min, to obtain a mixed solution with 0.04 M of $TiF_4$ and 0.02 M of $NiCL_4$.

In step (3), the Pt electrode (i.e., the anode) and an Ag/AgCl electrode (i.e., a reference electrode) are inserted, the AAO/Si composite template with the first nano zinc oxide film layer is adhered to a thin copper wire with silver adhesive as the cathode, and the AAO/Si composite template with the first nano zinc oxide film layer is inserted into the titanium containing electrolyte to soak about 10 min, to thereby enable the titanium containing electrolyte to enter into holes of the AAO/Si composite template with the first nano zinc oxide film layer. A deposition potential is −0.8 V to −0.4 V, and a time for the electrodeposition is 0.3-1.2 h. After depositing, the template is taken out, washed with the deionized water repeatedly, and then is soaked into the deionized water for 30 min to completely remove the titanium containing electrolyte. The template removed the titanium containing electrolyte is dried at 80° C. to obtain the first nano titanium dioxide film layer with a thickness of 15-30 nm.

In step 1.4, a magnetic nano film layer is electrodeposited on the AAO/Si composite template with the first nano zinc oxide film layer and the first nano titanium dioxide film layer, and the step 1.4 includes the following steps (1)-(3).

In step (1), the AAO/Si composite template with the first nano zinc oxide film layer and the first nano titanium dioxide film layer is used as a cathode, and the graphite is used as an anode.

In step (2), an electrodeposition solution is prepared, specifically including the follows: a solution with a total volume of 50 or 100 mL is prepared. 0.017 M of $NiSO_4 \cdot 6H_2O$, 0.0075 M of $FeSO_4 \cdot 7H_2O$ and 0.12 M of $Ga_2(SO_4)_3 \cdot 18H_2O$ are used as electrodeposition main salt. 0.2 M of $C_6H_5Na_3O_7 \cdot 2H_2O$ and 0.3 M of ammonium sulfate are used as a coordination agent, meanwhile, the ammonium sulfate is further used as a conductive salt of the electrodeposition solution. 0.5 M boric acid is used as a pH buffer agent, 0.02 M ascorbic acid is used as an antioxidant, 0.03 g/L sodium dodecyl sulfate is used as a treating compound, and a pH of the electrodeposition solution is adjusted to 2.5-3 by using NaOH and $H_2SO_4$.

In step (3), the dual-electrode system is used to perform electrochemical deposition under the room temperature and a constant voltage, a deposition voltage is 2.5 V, and a time for the electrochemical deposition is 1.2-2.5 h. The electrodeposition solution on a surface of the AAO template is cleaned thoroughly by using the NaOH solution, and the cleaned AAO template is dried at 80° C. to obtain the magnetic nano layer with a thickness of 30-50 nm.

In step 1.5, a second nano titanium dioxide film layer is electrodeposited on the AAO/Si composite template with the first nano zinc oxide film layer, the first nano titanium dioxide film layer and the magnetic nano film layer, and the step 1.5 includes the follows.

The step 1.3 is performed to obtain the second nano titanium dioxide film layer.

In step 1.6, a second nano zinc oxide film layer is electrodeposited on the AAO/Si composite template with the first nano zinc oxide film layer, the first nano titanium dioxide film layer, the magnetic nano film layer and the second nano titanium dioxide film layer, and the step 1.6 includes the follows.

The step 1.2 is performed to obtain the second nano zinc oxide film layer.

In step 1.7, the 3D magnetic photochromic nanoparticles are prepared, and the step 1.7 includes the follows.

A 3M470 electroplated tape is slowly adhered on the surface of the AAO template with the first nano zinc oxide film layer, the first nano titanium dioxide film layer, the magnetic nano film layer, the second nano titanium dioxide film layer, and the second nano zinc oxide film layer, the tape is pressed by a fingertip to be in fully contact with the AAO film, then the tape is slowly removed, the AAO template is stuck on the tape and torn off, and the remaining 3D magnetic photochromic nanoparticles are evenly arranged on the silicon wafer. The 3D magnetic photochromic nanoparticles are flaky particles with diameter of 450-500 nm and thickness of 100-160 nm at this time. The 3D magnetic photochromic nanoparticles are taken down and mixed evenly.

In step 2, the 3D magnetic anti-counterfeiting ink is prepared, and the step 2 includes the following steps (1)-(2).

(1) The prepared 3D magnetic photochromic nanoparticles are mixed and stirred with a pigment, a connector, a photo-initiator and an auxiliary to obtain 3D magnetic photochromic ink (2) 25% of the 3D magnetic photochromic nanoparticles, 12% of the pigment, 55% of the connector, 3.7% of the photo-initiator and 4.3% of the auxiliary are respectively weighed according to the weight percentages, and a sum of the weight percentages of the above components is 100%. Specifically, the connector is a mixture of epoxy acrylate and oxybis(methyl-2,1-ethanediyl) diacrylate with a weight ratio of 1:0.95, the auxiliary is a mixture of a defoamer, a dispersant, and a leveling agent, the photoinitiator is 2-hydroxy-4-(octyloxy)benzophenone, the pigment is light fast scarlet BBN ($C_{18}H_{13}ClN_2O_6S$).

The weighed compounds in the step (2) are mixed evenly to obtain the 3D magnetic anti-counterfeiting ink.

Comparative Embodiment 1

In the comparative embodiment 1, during the preparation of the 3D magnetic anti-counterfeiting ink, commonly used iron oxide black ($Fe_3O_4$) and iron oxide brown ($Fe_2O_3$) in the market are selected for surface evaporation and sputtering deposition to obtain a mixture, and the mixture is smashed into the magnetic nanoparticles, to thereby obtain the 3D magnetic anti-counterfeiting ink.

The 3D magnetic ink anti-counterfeiting layers of the 3D random magnetic pattern digital anti-counterfeiting labels prepared by the methods of the embodiment 1, the embodiment 2 and the comparative embodiment 1 are observed from different angles to obtain the following observed results.

Observed results of the 3D magnetic ink anti-counterfeiting layers from different angles

| Program | Embodiment 1 | Embodiment 2 | Comparative embodiment 1 |
|---|---|---|---|
| Angle-dependent light change effect | Angle-dependent light change | Angle-dependent light change | Angle-dependent light change |
| Brightness of optically variable bright stripes | Brightness | Brightness | Dark |
| Patterns of the optically variable bright stripes | Circular grain pattern | Circular grain pattern | irregular |

The observed results shown that the 3D magnetic anti-counterfeiting ink of the disclosure uses the AAO/Si composite template as the cathode substrate, and uniform distribution of magnetic layers, metal film layers, and inorganic film layers within ordered nanoholes on the substrate is achieved through electroplating. Compared to methods such as magnetron sputtering, vapor deposition, and evaporation to form the magnetic and functional films, the preparation method of the disclosure is more efficient and convenient. The sizes of the film-forming particles are consistent, and the film thicknesses are consistent. Moreover, complex steps of sputtering the magnetic film before smashing it into nanoparticles through the shear force are reduced, damage of the shear force on the surface of the film is avoided, thereby avoiding inconsistency of the surface of the film affecting the consistency of light refraction, absorption, and diffraction, causing the problem that the optically variable bright stripes on the label surface is not obvious with different light angles. Meanwhile, the optically variable bright stripes of the disclosure has obvious circular particle patterns, which have higher recognition compared to ordinary magnetic ink anti-counterfeiting.

What is claimed is:

1. A three-dimensional (3D) random magnetic pattern digital anti-counterfeiting label, comprising:

- a 3D magnetic ink anti-counterfeiting layer; and the 3D magnetic ink anti-counterfeiting layer comprises:
  - 3D magnetic photochromic nanoparticles, and each of the 3D magnetic photochromic nanoparticles comprises:
    - a first nano zinc oxide film layer, a first nano titanium dioxide film layer, a magnetic nano film layer, a second nano titanium dioxide film layer and a second nano zinc oxide film layer from bottom to top; and
- wherein the 3D magnetic photochromic nanoparticles are circular flaky particles, a diameter of each of the 3D magnetic photochromic nanoparticles is in a range of 450-500 nanometers (nm), and a thickness of each of the 3D magnetic photochromic nanoparticles is in a range of 100-160 nm.

2. The 3D random magnetic pattern digital anti-counterfeiting label as claimed in claim 1, wherein a thickness of the first nano zinc oxide film layer is in a range of 20-25 nm, a thickness of the first nano titanium dioxide film layer is in a range of 15-30 nm, a thickness of the magnetic nano film layer is in a range of 30-50 nm, a thickness of the second nano titanium dioxide film layer is in a range of 15-30 nm, and a thickness of the second nano zinc oxide film layer is in a range of 20-25 nm.

3. The 3D random magnetic pattern digital anti-counterfeiting label as claimed in claim 1, wherein an additional amount of the 3D magnetic photochromic nanoparticles in the 3D magnetic ink anti-counterfeiting layer is in a range of 15-25 weight percent (wt %).

4. The 3D random magnetic pattern digital anti-counterfeiting label as claimed in claim 1, further comprising: a release film layer, an adhesive layer, a polyethylene terephthalate (PET) plastic film layer, a printing layer, an anti-scratch protective layer and an anti-counterfeiting check code shielding layer; and the release film layer and the adhesive layer are disposed on a bottom of the PET plastic film layer, and the 3D magnetic ink anti-counterfeiting layer, the printing layer, the anti-scratch protective layer and the anti-counterfeiting check code shielding layer are disposed on a surface of the PET plastic film layer.

5. The 3D random magnetic pattern digital anti-counterfeiting label as claimed in claim 4, wherein the 3D magnetic ink anti-counterfeiting layer comprises: an anti-counterfeiting magnetic stripe area and an anti-counterfeiting quick response (QR) code area; the printing layer comprises: a logotype (LOGO) area and an anti-counterfeiting check code area; the 3D magnetic ink anti-counterfeiting layer is disposed on the surface of the PET plastic film layer; the LOGO area of the printing layer is disposed on the surface of the PET plastic film layer, and the anti-counterfeiting check code area of the printing layer is disposed on a surface of the 3D magnetic ink anti-counterfeiting layer; the anti-scratch protective layer is disposed on surfaces of the PET plastic film layer, the 3D magnetic ink anti-counterfeiting layer and the printing layer; and the anti-counterfeiting check code shielding layer is disposed on a surface of the anti-scratch protective layer, and is located right above the anti-counterfeiting check code area of the printing layer.

6. A preparation method of the 3D random magnetic pattern digital anti-counterfeiting label as claimed in claim 5, comprising:

- screen printing 3D magnetic anti-counterfeiting ink on the surface of the PET plastic film layer, performing magnetic fixation on the 3D magnetic anti-counterfeiting ink to obtain magnetic fixed 3D magnetic anti-counterfeiting ink, and performing ultraviolet (UV) curable on the magnetic fixed 3D magnetic anti-counterfeiting ink to rearrange and orient the 3D magnetic photochromic nanoparticles in the 3D magnetic anti-counterfeiting ink to thereby form the 3D magnetic ink anti-counterfeiting layer with the anti-counterfeiting magnetic stripe area and the anti-counterfeiting QR code area; wherein the 3D magnetic ink anti-counterfeiting layer comprises the 3D magnetic photochromic nanoparticles;
- inkjet printing a LOGO and an anti-counterfeiting check code on the surfaces of the PET plastic film layer and the 3D magnetic ink anti-counterfeiting layer respectively to form the printing layer with the LOGO area and the anti-counterfeiting check code area;
- coating UV varnish on the surfaces of the PET plastic film layer, the 3D magnetic ink anti-counterfeiting layer and the printing layer to form the anti-scratch protective layer;
- screen printing scratch-off ink on the surface of the anti-scratch protective layer to form the anti-counterfeiting check code shielding layer;
- writing product information in the anti-counterfeiting magnetic stripe area of the 3D magnetic ink anti-counterfeiting layer; and
- coating an adhesive on the bottom of the PET plastic film layer to form the adhesive layer, coating the release film layer on a bottom surface of the adhesive layer to thereby obtain a product, and die-cutting the product to obtain the 3D random magnetic pattern digital anti-counterfeiting label.

7. The preparation method as claimed in claim 6, wherein a preparation process of the 3D magnetic photochromic nanoparticles by using an anodic aluminum oxide (AAO) template method specifically comprises:

- step 1, preparing a double-pass AAO template, and compounding the double-pass AAO template with a silicon (Si) wafer to obtain an AAO/Si composite template;
- step 2, preparing a zinc containing electrolyte, and using the AAO/Si composite template as a cathode and using graphite as an anode to perform electrochemical deposition to obtain an AAO/Si composite template deposited with the first nano zinc oxide film layer as a composite template A;
- step 3, preparing a titanium containing electrolyte, and using the composite template A as a cathode, using platinum as an anode, and using silver/silver chloride as a reference electrode to perform electrochemical deposition to thereby further deposit the first nano titanium dioxide film layer on a surface of the first nano zinc oxide film layer, to thereby obtain a composite template B;

step 4, preparing a nickel, iron, and gallium containing electrodeposition solution, and using the composite template B as a cathode, using graphite as an anode, and using a dual-electrode system to perform electrochemical deposition, to thereby further deposit the magnetic nano film layer on a surface of the first nano titanium dioxide film layer, to thereby obtain a composite template C;

step 5, preparing a titanium containing electrolyte, and using the composite template C as a cathode, using platinum as an anode, and using silver/silver chloride as a reference electrode to perform electrochemical deposition, to thereby further deposit the second nano titanium dioxide film layer on a surface of the magnetic nano film layer, to thereby obtain a composite D; and step 6, preparing a zinc containing electrolyte, using the composite template D as a cathode and using graphite as an anode to perform electrochemical deposition, to thereby further deposit the second nano zinc oxide film layer on a surface of the second nano titanium dioxide film layer, and removing the AAO/Si composite template to obtain the 3D magnetic photochromic nanoparticles.

8. A product with anti-counterfeiting function, wherein the product is provided with the 3D random magnetic pattern digital anti-counterfeiting label as claimed in claim 1.

* * * * *